United States Patent
Hori

(10) Patent No.: US 9,658,774 B2
(45) Date of Patent: May 23, 2017

(54) STORAGE SYSTEM AND STORAGE CONTROL METHOD

(71) Applicants: HITACHI, LTD., Tokyo (JP); HITACHI INFORMATION & TELECOMMUNICATION ENGINEERING, LTD., Yokohama-shi, Kanagawa (JP)

(72) Inventor: Taizo Hori, Tokyo (JP)

(73) Assignees: HITACHI, LTD., Tokyo (JP); HITACHI INFORMATION & TELECOMMUNICATION ENGINEERING, LTD., Kanagawa (JP)

( * ) Notice: Subject to any disclaimer, the term of this patent is extended or adjusted under 35 U.S.C. 154(b) by 69 days.

(21) Appl. No.: 14/427,839

(22) PCT Filed: Jul. 9, 2014

(86) PCT No.: PCT/JP2014/068254
§ 371 (c)(1),
(2) Date: Mar. 12, 2015

(87) PCT Pub. No.: WO2016/006050
PCT Pub. Date: Jan. 14, 2016

(65) Prior Publication Data
US 2016/0259564 A1 Sep. 8, 2016

(51) Int. Cl.
*G06F 12/00* (2006.01)
*G06F 13/00* (2006.01)
(Continued)

(52) U.S. Cl.
CPC .............. *G06F 3/0608* (2013.01); *G06F 3/06* (2013.01); *G06F 3/065* (2013.01); *G06F 3/068* (2013.01);
(Continued)

(58) Field of Classification Search
CPC .... G06F 3/0608; G06F 3/0614; G06F 3/0631; G06F 3/0641; G06F 3/0644; G06F 3/065;
(Continued)

(56) References Cited

U.S. PATENT DOCUMENTS 7,870,409 B2 * 1/2011 Murase .................. G06F 1/3268
711/162
7,962,520 B2 * 6/2011 Patterson .......... G06F 17/30312
707/791
(Continued)

FOREIGN PATENT DOCUMENTS

JP 2010-026965 A 2/2010
JP 2012-523023 A 9/2012
(Continued)

OTHER PUBLICATIONS

E-DAID: An Efficient Distributed Architecture for In-Line Data De-duplication; Sengar et al; 2012 International Conference on Communication Systems and Network Technologies (CSNT); May 11-13, 2012; pp. 438-442 (5 pages).*
(Continued)

*Primary Examiner* — Daniel C Chappell
(74) *Attorney, Agent, or Firm* — Volpe and Koenig, P.C.

(57) ABSTRACT

A controller in a storage system has chunk statistical information to be information including an overlap prevention effect value of each stored chunk data. For each storage target chunk data to be each chunk data obtained by dividing a data block of a storage target, the controller executes an overlap search to search the stored chunk data matched with the storage target chunk data in an overlap search range to be a part of a plurality of stored chunk data shown by the chunk statistical information and a chunk data group specified from the chunk statistical information and stores the storage target chunk data in the storage device, when the
(Continued)

matched stored chunk data is not discovered in the overlap search.

6 Claims, 17 Drawing Sheets

(51) Int. Cl.
*G06F 13/28* (2006.01)
*G06F 3/06* (2006.01)
*G06F 12/1018* (2016.01)

(52) U.S. Cl.
CPC ............ *G06F 3/0644* (2013.01); *G06F 12/00* (2013.01); *G06F 12/1018* (2013.01)

(58) Field of Classification Search
CPC ...... G06F 3/068; G06F 3/0671; G06F 3/0673; G06F 3/0674; G06F 3/0676; G06F 3/0677; G06F 3/0679; G06F 3/0683; G06F 3/0685; G06F 3/0686; G06F 3/0688; G06F 3/0689; G06F 9/455; G06F 9/50; G06F 11/1402; G06F 11/2056; G06F 12/0223; G06F 12/0246; G06F 12/0284; G06F 12/0292; G06F 12/10; G06F 12/1009; G06F 12/1018
USPC ........................................................ 711/153
See application file for complete search history.

(56) References Cited

U.S. PATENT DOCUMENTS

| | | | | |
|---|---|---|---|---|
| 8,051,050 | B2* | 11/2011 | Popovski | G06F 3/0608 707/692 |
| 8,086,799 | B2* | 12/2011 | Mondal | G06F 3/0608 711/116 |
| 8,285,690 | B2* | 10/2012 | Nakamura | G06F 3/0608 707/692 |
| 8,321,648 | B2* | 11/2012 | Condict | G06F 3/0608 711/114 |
| 8,327,097 | B2* | 12/2012 | Miyamoto | G06F 11/1453 707/664 |
| 8,370,309 | B1* | 2/2013 | Ramarao | G06F 17/30156 707/664 |
| 8,370,593 | B2* | 2/2013 | Arakawa | G06F 3/0608 711/161 |
| 8,442,954 | B2* | 5/2013 | Spackman | G06F 3/0608 707/692 |
| 8,572,340 | B2* | 10/2013 | Vijayan | G06F 11/1453 707/640 |
| 8,583,607 | B1* | 11/2013 | Chen | G06F 3/0641 707/692 |
| 8,832,394 | B2* | 9/2014 | Mitra | G06F 11/1435 711/161 |
| 8,874,863 | B2* | 10/2014 | Mutalik | G06F 17/30162 707/637 |
| 8,898,119 | B2* | 11/2014 | Sharma | G06F 3/0608 707/692 |
| 8,983,915 | B2* | 3/2015 | Mutalik | G06F 17/30162 707/690 |
| 9,164,688 | B2* | 10/2015 | Aronovich | G06F 3/0641 |
| 9,195,692 | B2* | 11/2015 | Watanabe | G06F 17/30303 |
| 9,348,538 | B2* | 5/2016 | Mallaiah | G06F 3/0608 |
| 2009/0049260 | A1* | 2/2009 | Upadhyayula | G06F 3/0608 711/162 |
| 2009/0089483 | A1* | 4/2009 | Tanaka | G06F 3/0608 711/103 |
| 2009/0217091 | A1* | 8/2009 | Miyamoto | G06F 11/1453 714/19 |
| 2010/0023713 | A1 | 1/2010 | Nasu et al. | |
| 2010/0131480 | A1* | 5/2010 | Schneider | G06F 17/3015 707/698 |
| 2011/0040728 | A1* | 2/2011 | Akirav | G06F 11/2094 707/634 |
| 2011/0191305 | A1* | 8/2011 | Nakamura | G06F 3/0608 707/692 |
| 2011/0225191 | A1* | 9/2011 | Xie | G06F 17/30631 707/775 |
| 2012/0016852 | A1* | 1/2012 | Tofano | G06F 17/30159 707/698 |
| 2012/0330907 | A1* | 12/2012 | Nakamura | G06F 3/0608 707/692 |
| 2013/0246557 | A1* | 9/2013 | Das | H04L 67/32 709/217 |
| 2013/0275394 | A1* | 10/2013 | Watanabe | G06F 17/30303 707/692 |
| 2014/0114932 | A1* | 4/2014 | Mallaiah | G06F 3/0608 707/692 |
| 2014/0279953 | A1* | 9/2014 | Aronovich | G06F 17/30159 707/692 |
| 2014/0297980 | A1* | 10/2014 | Yamazaki | G06F 3/0614 711/162 |

FOREIGN PATENT DOCUMENTS

| | | |
|---|---|---|
| JP | 2013-178614 A | 9/2013 |
| JP | 5444506 B1 | 3/2014 |
| WO | 2011033582 A1 | 3/2011 |

OTHER PUBLICATIONS

Exploiting Data Deduplication to Accelerate Live Virtual Machine Migration; Zhang et al; 2010 IEEE International Conference on Cluster Computing (CLUSTER); Sep. 20-24, 2010; pp. 88-96 (9 pages).*

ProSy: A similarity based inline deduplication system for primary storage; Du et al; 2015 IEEE International Conference on Networking, Architecture and Storage (NAS); Aug. 6-7, 2015; pp. 195-204 (10 pages).*

Tuning large scale deduplication with reduced effort; Dal Bianco et al; Proceedings of the 25th International Conference on Scientific and Statistical Database Management, Article No. 18; Jul. 29, 2013 (12 pages).*

Droplet: A Distributed Solution of Data Deduplication; Zhang et al; 2012 ACM/IEEE 13th International Conference on Grid Computing; Sep. 20-23, 2012; pp. 114-121 (8 pages).*

* cited by examiner

Fig. 3

| Data block table 200 | | |
|---|---|---|
| Data block ID 201 | Chunk group ID 202 | Chunk FP 203 |
| DB887 | CG211 | FP557 |
| | CG211 | FP239 |
| | CG211 | FP701 |
| | CG211 | FP491 |
| DB499 | CG211 | FP557 |
| | CG211 | FP239 |
| | CG211 | FP701 |
| | CG211 | FP491 |
| | CG347 | FP113 |
| DB673 | CG211 | FP557 |
| | CG211 | FP239 |
| | CG211 | FP701 |
| | CG211 | FP491 |
| | CG419 | FP269 |
| ... | ... | ... |

| Chunk group table (220) | | |
|---|---|---|
| Chunk group ID (221) | Chunk FP (222) | Storage destination of chunk data (223) |
| CG211 | FP557 | &A |
| | FP239 | &B |
| | FP701 | &C |
| | FP491 | &D |
| CG347 | FP113 | &E |
| CG419 | FP269 | &F |
| ... | ... | ... |

230a points to the CG211 row group.

Fig. 5

| Reference data block table 240 | |
|---|---|
| Chunk group ID 241 | Data block ID 242 |
| CG211 | DB887 |
|  | DB499 |
|  | DB673 |
| CG347 | DB499 |
| CG419 | DB673 |
| CG800 | NULL |
| ... | ... |

250a → CG211 rows
250d → CG800 row

Fig. 6

| Chunk index table 260 | |
|---|---|
| Chunk hash value 261 | Chunk group ID 262 |
| FP557 | CG211 |
| FP113 | CG347 |
| FP269 | CG419 |
| ... | ... |

Chunk statistical table (280)

| Hash group ID (281) | Group overlap number (282) | Group reduction data amount (283) | Group temporary occupation data amount (284) | Overlap prevention effect value (285) |
|---|---|---|---|---|
| 0x00000000 | 0 | 0 | 0 | 0 |
| 0x00000001 | 0 | 0 | 0 | 0 |
| 0x00000002 | 0 | 0 | 0 | 0 |
| 0x00000003 | 2 | 1,024 | 2,048 | $2.0 \times 10^3$ |
| 0x00000004 | 7 | 4,096 | 12,538 | $2.9 \times 10^4$ |
| 0x00000005 | 1,000,000 | 3,778,000 | 3,779,152 | $3.8 \times 10^{12}$ |
| 0x00000006 | 200 | 12,052 | 48,661 | $2.4 \times 10^6$ |
| 0x00000007 | 321 | 26,443 | 53,887 | $8.5 \times 10^6$ |
| ... | ... | ... | ... | ... |
| 0xfffffffe | 2,092,375 | 4,937,002 | 135,314,935 | $1.0 \times 10^{13}$ |
| 0xffffffff | 0 | 0 | 0 | 0 |

Search node table — 300

| Hash group ID (301) | Node ID (302) | Skip flag (303) |
|---|---|---|
| ... | ... | ... |
| 0x00000004 | 11 | 1 |
| 0x00000005 | 12 | 0 |
| 0x00000006 | 13 | 0 |
| ... | ... | ... |

310a → first ... row
310b → 0x00000004 and 0x00000005 rows

STORAGE SYSTEM AND STORAGE CONTROL METHOD

TECHNICAL FIELD

The present invention relates to storage control. For example, the present invention relates to technology for storage control of data in a storage system.

BACKGROUND ART

Technology of overlap prevention for dividing a data block into a plurality of chunk data and causing the same chunk data not to be stored in storage areas in an overlapped manner, thereby efficiently using the storage areas in a storage system, has been known.

PTL 1 describes technology for managing whether each chunk data is referred to from some place as a reference counter in a file system for performing the overlap prevention and erasing the chunk data when the reference counter becomes "0".

CITATION LIST

Patent Literature

PTL 1: US 2010/0131480

SUMMARY OF INVENTION

Technical Problem

However, the storage system manages information of several billions to tens of billions of chunk data. Therefore, if the number of chunk data increases, an amount of information to be managed also increases. As a result, a load of a search process (search process of chunk data to be overlapped) executed for the overlap prevention increases. This leads to deterioration of entire performance of the storage system.

Accordingly, an object of the present invention is to alleviate a process load associated with an increase in chunk data, in a storage system for executing overlap prevention.

Solution to Problem

A storage system according to an embodiment of the present invention includes a storage device and a controller to control the storage device.

Chunk data to be constituent elements of a data block are stored in the storage device.

The controller has chunk statistical information to be information including an overlap prevention effect value of each stored chunk data.

Each stored chunk data is chunk data stored in the storage device. The overlap prevention effect value of each stored chunk data is a value showing an effect of overlap prevention of the stored chunk data and is a value calculated on the basis of an overlap number of the stored chunk data. The overlap number of each stored chunk data is a number according to the number of chunk data overlapped to the stored chunk data.

The controller executes a storage process for a data block of a storage target. In the storage process, for each storage target chunk data to be each chunk data obtained by dividing the data block of the storage target, the controller executes an overlap search to search the stored chunk data matched with the storage target chunk data in an overlap search range to be a part of a plurality of stored chunk data shown by the chunk statistical information and a chunk data group specified from the chunk statistical information and stores the storage target chunk data in the storage device, when the matched stored chunk data is not discovered in the overlap search.

Advantageous Effects of Invention

According to the present invention, a process load associated with an increase in chunk data can be alleviated, in a storage system for executing overlap prevention.

BRIEF DESCRIPTION OF DRAWINGS

FIG. 3 illustrates a configuration example of a data block table.

FIG. 4 illustrates a configuration example of a chunk group table.

FIG. 5 illustrates a configuration example of a reference data block table.

FIG. 6 illustrates a configuration example of a chunk index table.

FIG. 7 illustrates a configuration example of a chunk statistical table.

FIG. 15 illustrates a configuration example of a search node table.

DESCRIPTION OF EMBODIMENTS

Figure 1:
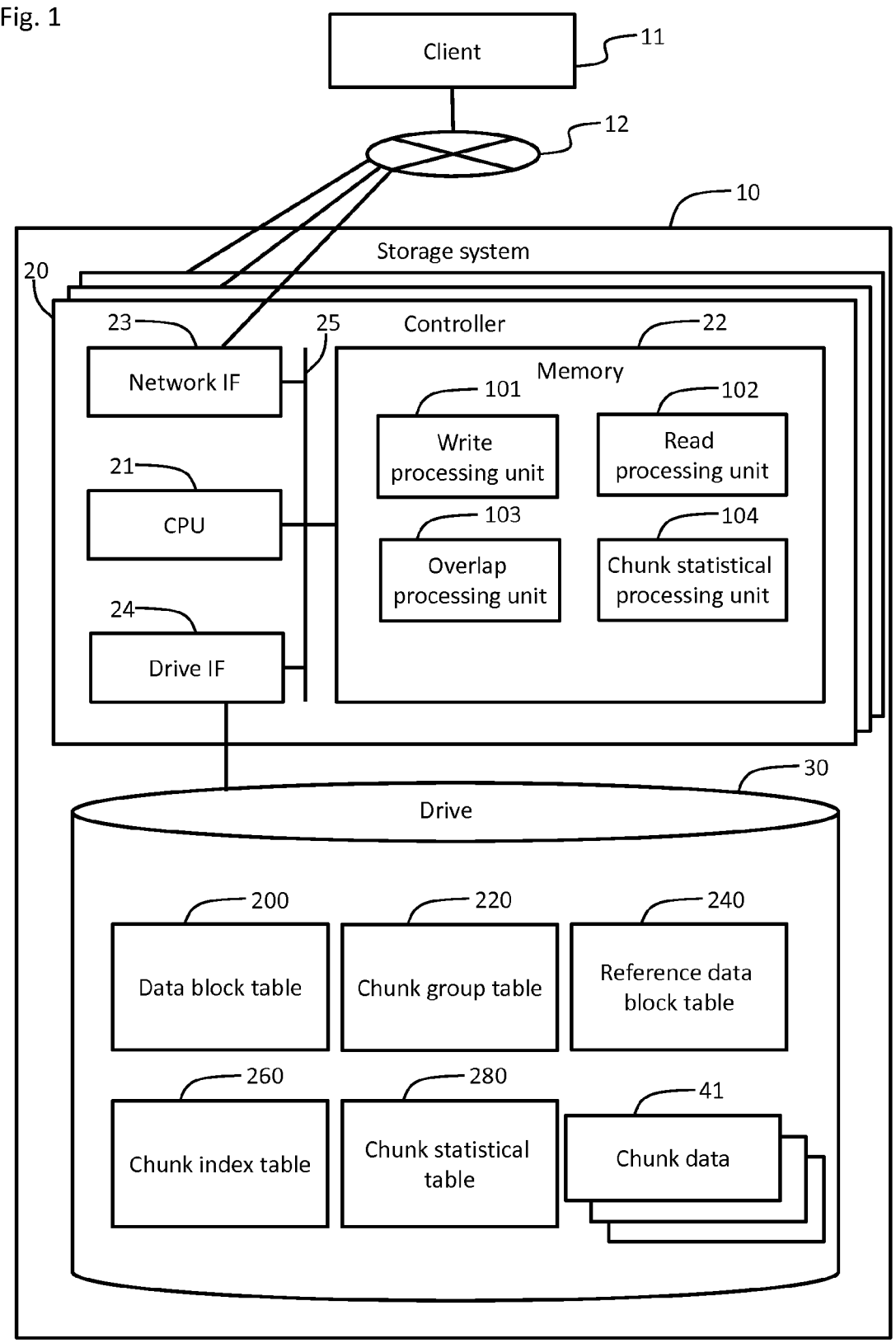
FIG. 1 illustrates a configuration example of a storage system according to a first embodiment.

Hereinafter, an embodiment will be described.

In the following description, information is described using an expression of an "xxx table". However, the information may be expressed by any data structure. That is, the "xxx table" can be referred to as "xxx information" to show that the information does not depend on the data structure.

In addition, in the following description, a process is described using an "xxx processing unit" as a subject. However, the processing unit that is a type of computer programs is executed by a processor (for example, a CPU (Central Processing Unit)) to execute a prescribed process while appropriately using at least one of a storage resource (for example, a memory) and a communication interface device. Therefore, the subject of the process may be the processor or an apparatus having the processor. A part or all of processes executed by the processor may be executed by a hardware circuit. A computer program may be installed from a program source. The program source may be a program distribution server or storage media (for example, portable storage media).

In addition, in the following description, when the same types of elements are distinguished from each other and are described, reference numerals may be used like "xxx250a" and "xxx250b" and when the same types of elements are not distinguished from each other and are described, only a common number of the reference numerals may be used like "xxx250".

First Embodiment

Hereinafter, an example of the case in which a load of a search process of chunk data to be overlapped is alleviated in storage system for executing overlap prevention will be described. Generally, a ratio of active data having large overlap numbers to data in a storage system for executing overlap prevention is about 25%. In the related art, in order to register the active data of 25%, hash values of all data are computed and overlapped data is searched. That is, a load of a process for searching the overlapped data is high.

A normal database to manage sales data or customer information configures all of registered data as search targets. This is because search omission becomes a critical problem.

Meanwhile, in the storage system for executing the overlap prevention, even if registered chunk data cannot be discovered in an overlap search, the chunk data is overlapped and registered and the critical problem does not occur. In this embodiment, a load of a search process pertaining to the overlap prevention is alleviated by utilizing such a characteristic of the storage system for executing the overlap prevention.

FIG. 1 illustrates a configuration example of a storage system 10 according to a first embodiment.

The storage system 10 is coupled to a client 11 through a communication network 12 and stores data according to a write request from the client 11 or transmits the stored data to the client 11 according to a read request from the client 11. The client 11 may be a so-called electronic computer. As the communication network 12, a storage area network (SAN), a local area network (LAN), or a combination of the SAN or the LAN and an Internet network is exemplified.

The storage system 10 includes a CPU 21, a memory 22, a network interface (IF) 23, a drive IF 24, and a drive 30, which are coupled by a bus 25 that enables bidirectional data transmission and reception.

The CPU 21 manages a computer program and data stored in the memory 22 and realizes various functions regarding the storage system 10. The CPU 21 processes I/O with the client 11 through the network IF 23 or processes I/O with the drive through the drive IF 24. As the memory 22, dynamic random access memory (DRAM) or magnetoresistive random access memory (MRAM) is exemplified. Hereinafter, the CPU 21, the memory 22, the network IF 23, and the drive IF 24 may be collectively referred to as a controller 20.

In the drive 30, data is stored. As the drive 30, a hard disk drive (HDD) or a solid state drive (SSD) is exemplified. Data read and written from the client 11 and a variety of information used by the controller 20 are stored in the drive 30.

The controller 20 divides a data block according to a write request into one or more chunk data, prevents the same chunk data from being stored in an overlapped manner, and stores each chunk data in the drive 30. This is to efficiently use a capacity of the drive 30. This is referred to as "overlap prevention".

The drive 30 has various tables 200, 220, 240, 260, and 280 to manage the overlap prevented chunk data.

The data block table 200 has information showing an association of each data block 40 and a plurality of chunk data 41 configuring each data block. The data block table 200 will be described in detail below (refer to FIG. 4).

The chunk group table 220 has information showing an association of each chunk data 41 and a chunk group 60 to which each chunk data 41 belongs. The chunk group table 220 will be described in detail below (refer to FIG. 5).

The chunk index table 260 has information showing which chunk group 60 the chunk data 41 belongs to. The chunk index table 260 will be described in detail below (refer to FIG. 7).

The reference data block table 240 has information showing an association of each chunk group 60 and the data block 40 using any chunk data 41 belonging to each chunk group 60 as a constituent element. The reference data block table 240 will be described in detail below (refer to FIG. 6).

The chunk statistical table 280 has information of an overlap prevention effect value regarding the chunk data 41 stored in the drive 30. The overlap prevention effect value is a value showing an effect of the overlap prevention of the stored chunk data 41. The overlap prevention effect value may be a value calculated on the basis of an overlap number showing an overlap degree of the chunk data 41.

The overlap prevention effect value may be calculated for each group obtained by grouping the chunk data 41 stored in the drive 30 under a predetermined condition. For example, the chunk data 41 in which upper N (N is a positive integer) bytes of a hash value (referred to as a "chunk hash value") calculated by a hash function from the chunk data 41 are common may be grouped. This group is referred to as a "hash group". In the chunk statistical table 280, each hash group and an overlap prevention effect value calculated for each hash group may be associated. An example of a method of calculating the overlap prevention effect value and the detail of the chunk statistical table 280 will be described below (refer to FIG. 7).

The controller 20 has a write processing unit 101, a read processing unit 102, an overlap processing unit 103, and a chunk statistical processing unit 104 as types of computer programs.

The write processing unit 101 executes a process for writing the data block according to the write request transmitted from the client 11 to the drive 30. The write processing unit 101 divides the data block into one or more chunk data and writes the chunk data to the drive 30. In addition, the write processing unit 101 may change the various tables 200, 220, 240, 260, and 280 to manage overlap of the chunk data. The write processing unit 101 may store the chunk data in the drive 30 through the overlap processing unit 103 to be described below.

The read processing unit 102 executes a process for reading the data block according to the read request transmitted from the client 11 from the drive 30. At this time, the read processing unit 102 refers to the various tables 200, 220, 240, 260, and 280 and reconfigures the data block from one or more chunk data.

The overlap processing unit 103 stores chunk data of a storage target in the drive 30 or executes an overlap search to search whether overlapped chunk data exists in the drive 30. However, the overlap processing unit 103 executes the overlap search in consideration of a balance of time necessary for the overlap search and an effect by the overlap prevention, instead of executing the overlap search for all of the chunk data stored in the drive 30. That is, the overlap processing unit 103 searches the chunk data overlapped (matched) to the chunk data of the storage targets, sequentially from the chunk data having a highest overlap prevention effect in the drive 30, as the overlap search.

When the overlapped chunk data cannot be discovered in the chunk data between the chunk data having the highest overlap prevention effect to the chunk data having the predetermined ranking (referred to as an "overlap search range"), the overlap processing unit 103 does not continuously execute the overlap search and stores the chunk data of the storage target in the drive 30. In this case, the overlap may occur. However, because the overlap prevention effect is low, decreasing the time necessary for the overlap search may increase the entire merit of the system. A degree of the overlap prevention effect of each chunk data may be registered as an overlap prevention effect value in the chunk statistical table 280.

Meanwhile, when the overlapped chunk data can be discovered in the overlap search range, the overlap processing unit 103 does not store the chunk data of the storage targets in the drive 30 and executes an overlap prevention process for updating information regarding the overlapped chunk data in each table.

The overlap prevention effect value may be calculated for each group in which a plurality of chunk data is collected, not each chunk data. For example, a chunk data group in which a value of upper N bytes of a chunk hash value calculated from the chunk data by the predetermined hash function is common may be configured as one hash group. The upper N bytes of the chunk hash value may be referred to as a "partial hash value". In this embodiment, a chunk data group in which upper 4 bytes of the chunk hash value are common will be described as one hash group. In this case, the overlap processing unit 103 stores the chunk data of the storage targets in the drive 30 or executes the overlap search as follows. That is, the overlap processing unit 103 determines whether the hash group is matched with the partial hash value of the storage target, sequentially from the hash group having the largest overlap prevention effect value.

When the matched hash group cannot be discovered in the hash groups between the hash group having the largest overlap prevention effect value to the hash group having the predetermined ranking (overlap search range), the overlap processing unit 103 does not continuously execute the overlap search and stores the chunk data of the storage target in the drive 30. An overlap prevention effect value of each hash group may be registered in the chunk statistical table 280.

Meanwhile, when the matched hash group can be discovered in the overlap search range, the overlap processing unit 103 may search whether chunk data overlapped to the chunk data of the storage target exists, from the chunk data group belonging to the hash group. When the overlapped chunk data can be discovered from the hash group, the overlap processing unit 103 may execute a storage process of the overlap prevention and when the overlapped chunk data cannot be discovered, the overlap processing unit 103 may execute a normal storage process.

The chunk statistical processing unit 104 generates and updates the chunk statistical table 280, on the basis of the content of the chunk data and the various tables stored in the drive 30. The chunk statistical processing unit 104 may generate and update the chunk statistical table 280 when the system starts, for example. The chunk statistical processing unit 104 may update the chunk statistical table 280 regularly, for example, once a day. The chunk statistical processing unit 104 may update the chunk statistical table 280 at timing when the write process of the chunk data is completed, for example. The process content of the chunk statistical processing unit 104 will be described below (refer to FIG. 8).

Figure 2:
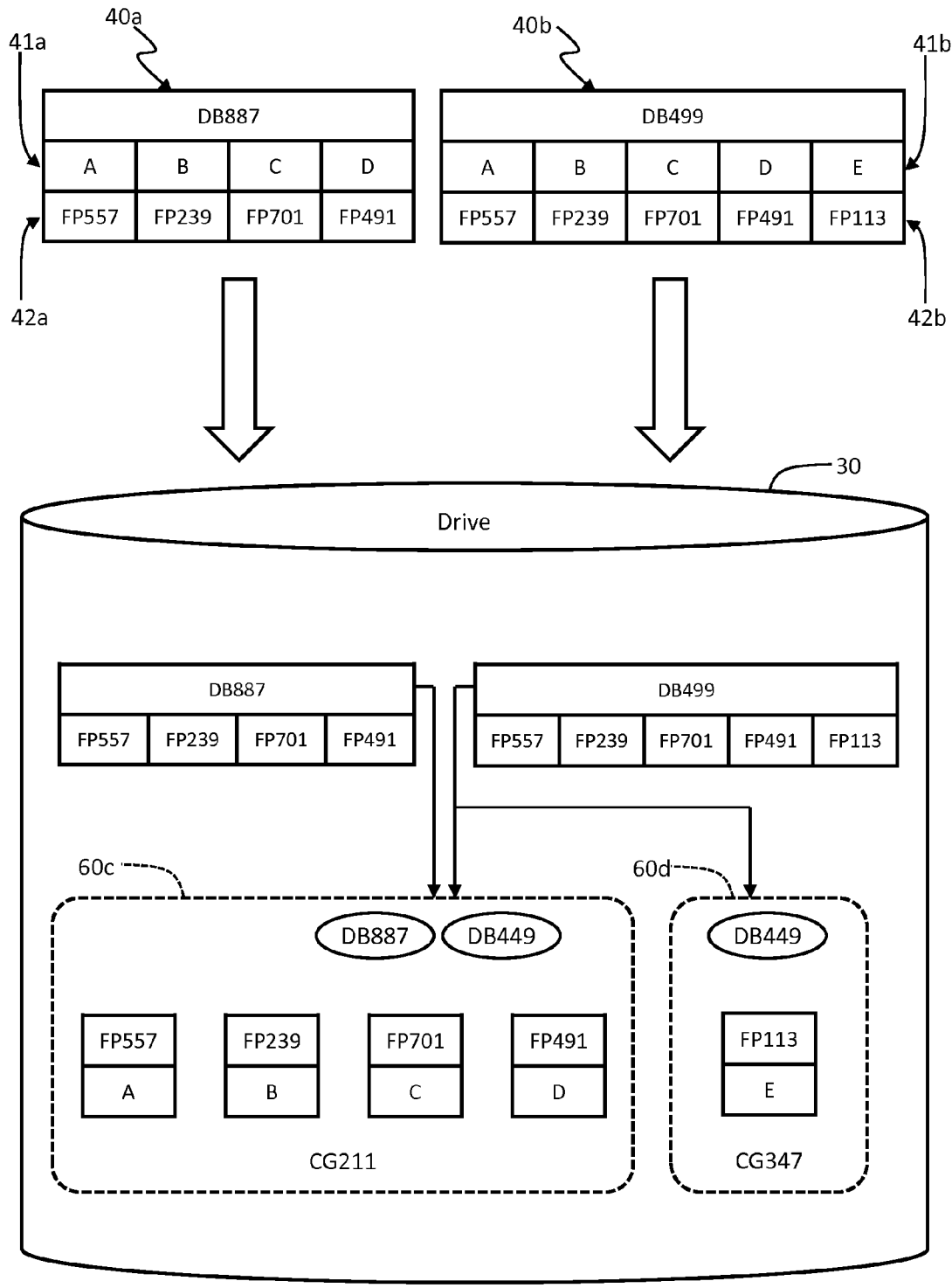
FIG. 2 is a schematic diagram illustrating a mechanism of overlap prevention in the storage system according to the first embodiment.

FIG. 2 is a schematic diagram illustrating a mechanism of the overlap prevention in the storage system according to the first embodiment. Hereinafter, the case in which the storage process of the overlap prevention is executed will be described with reference to the chunk statistical table in which the chunk data and the overlap prevention effect values are associated. Therefore, the process is partially different in the case of referring to the chunk statistical table 280 illustrated in FIG. 7, in which the hash groups and the overlap prevention effect values are associated.

When the controller 20 receives a first data block (DB887) regarding the write request from the client 11, the controller 20 executes the following process.

(S11) The controller 20 divides the data block 40*a* (DB887) into chunk data 41*a* (A, B, C, and D) having the predetermined sizes and calculates chunk hush values 42*a* (FP557, FP239, FP701, and FP491) corresponding to the individual chunk data.

(S12) The controller 20 executes the overlap search for each chunk hash value 42*a*. Here, it is assumed that all of the chunk hash values 42*a* are not hit to the overlap search. In this case, the controller 20 executes the following process.

(S13) The controller 20 generates a new chunk group 60*c* (CG211) to cause the chunk hash values 42*a* to belong to.

(S14) The controller 20 causes the chunk hash values 42*a* (FP557, FP239, FP701, and FP491) to belong to the new chunk group 60*c* (CG211).

(S15) The controller 20 associates the data block 40*a* (DB887), the chunk hash values 42*a* (FP557, FP239, FP701, and FP491) corresponding to the chunk data 41*a* (A, B, C, and D) divided from the data block 40*a*, and the chunk group 60*c* (CG211) which the individual chunk hash values 42*a* belong to and registers the association in the data block table 200.

(S16) The controller 20 associates the newly generated chunk group 60*c* (CG211), the chunk hash values 42*a* (FP557, FP239, FP701, and FP491) belonging to the chunk group 60*c*, and the chunk data 41*a* (A, B, C, and D) corresponding to the chunk hash values 42*a* (FP557, FP239, FP701, and FP491) and registers the association in the chunk group table 220.

(S17) The controller 20 associates the chunk group 60*c* (CG211) which the new chunk data 41*a* (A, B, C, and D) configuring the data block 40*a* (DB887) belong to and the data block 40*a* (DB887) and registers the association in the reference data block table 240.

In this situation, when the controller 20 according to this embodiment receives the data block 40*b* (DB499) according to the write request from the client 11, the controller 20 executes the following process.

(S21) The controller 20 divides the data block 40*b* (DB499) into the chunk data 41*b* (A, B, C, D, and E) having the predetermined sizes and calculates the chunk hush values 42b (FP557, FP239, FP701, FP491, and FP113) corresponding to the individual chunk data.

(S22) The controller 20 executes the overlap search for each chunk hash value 42b. Here, it is assumed that partial chunk hash values (FP557, FP239, FP701, and FP491) are hit to the overlap search. In this case, the controller 20 executes the following process.

(S23) The controller 20 specifies the chunk group 60c (CG211) which the same chunk hash values (FP557, FP239, FP701, and FP491) belong to. In addition, the controller 20 generates a new chunk group 60d (CG347) to cause the chunk hash value (FP113) not hit to the overlap search to belong to.

(S24) The controller 20 associates the data block 40b (DB499), the chunk hash values (FP557, FP239, FP701, FP491, and FP113) in which the same chunk hash values exist in the drive 30, and the chunk group 60c (CG211) which the individual chunk hash values belong to and registers the association in the data block table 200. In addition, the controller 20 associates the data block 40b (DB499), the chunk hash values (FP113) not hit to the overlap search, and the chunk group 60b (CG347) which the chunk hash values belong to and registers the association in the data block table 200.

(S25) The controller 20 associates the newly generated chunk group 60d (CG347), the chunk hash value (FP113) belonging to the chunk group 60d (CG347), and the chunk data (E) corresponding to the chunk hash value (FP113) and registers the association in the chunk group table 220.

(S26) The controller 20 associates the chunk group 60c (CG211) which the chunk hash values (FP557, FP239, FP701, FP491, and FP113) hit to the overlap search belong to and the data block 40b (DB499) and registers the association in the reference data block table 240. In addition, the controller 20 associates the newly generated chunk group 60d (CG347) and the data block 40b (DB499) and registers the association in the reference data block table 240.

FIG. 3 illustrates a configuration example of the data block table 200.

The data block table 200 is a table to manage which chunk data 41 each data block 40 is configured by. The data block table 200 has a record 210 to associate a data block ID 201 and one or more chunk group IDs 202 and associate each chunk group ID 202 and a chunk hush value 203.

The data block ID 201 is information to identify the data block 40.

The chunk group ID 202 is information to identify the chunk group 60.

The chunk hush value 203 is information to identify the chunk data 41 and is a hash value calculated from the chunk data 41, for example.

For example, a record 210b in FIG. 3 shows that the data block (201) "DB499" includes chunk data 41 corresponding to chunk hush values (203) "FP557", "FP239", "FP701", "FP491", and "FP113", the chunk hush values (203) "FP557", "FP239", "FP701", and "FP491" belong to the chunk group (202) "CG211", and the chunk hush value (203) "113" belongs to the chunk group (202) "CG347".

FIG. 4 illustrates a configuration example of the chunk group table 220.

The chunk group table 220 is a table to manage which chunk group 60 each chunk data 41 belongs to. The chunk group table 220 has a record 230 to associate a chunk group ID 221 and one or more chunk hush values 222 and associate each chunk hush value 222, a storage destination 223 of chunk data, and an optimization flag 224. The chunk group ID 221 and the chunk hush value 222 are as described above.

The storage destination 223 of the chunk data shows a place where the chunk data 41 corresponding to the chunk hush value 222 is stored. For example, the storage destination 223 of the chunk data is a logical address at which the chunk data 41 is stored in a storage area of the drive 30.

For example, a record 230a in FIG. 4 shows that the chunk hush values (222) "FP557", "FP239", "FP701", and "FP491" belong to the chunk group (221) "CG211", the chunk data corresponding to the individual chunk hush values are stored in places shown by logical addresses "&A", "&B", "&C", and "&D".

FIG. 5 illustrates a configuration example of the reference data block table 240.

The reference data block table 240 is a table to manage which data block 40 each chunk group 60 is referred to from. The reference data block table 240 has a record 250 to associate a chunk group ID 241 and one or more data block IDs 242. The chunk group ID 241 and the data block ID 242 are as described above.

For example, a record 250a in FIG. 6 shows that the chunk data (chunk hash values) belonging to the chunk group (241) "CG211" are referred to from the data blocks (242) "DB887", "DB449", and "DB673".

For example, a record 250d in FIG. 5 shows that all of the chunk data (chunk hash values) belonging to the chunk group (241) "CG800" are not referred to from all of the data blocks (242) (NULL). In this case, the controller 20 determines that all of the chunk data (chunk hash values) belonging to the chunk group "CG800" can be erased.

FIG. 6 illustrates a configuration example of the chunk index table 260.

The chunk index table 260 is a table to manage which chunk group 60 each chunk hash value 42 belongs to. The chunk index table 260 is used to search the chunk group which the chunk hash value belongs to at a high speed. The chunk index table 260 has a record 270 in which a chunk hash value 261 and a chunk group ID 262 are associated. The chunk hash value 261 and the chunk group ID 262 are as described above.

For example, a record 270a in FIG. 6 shows that a chunk hash value (261) "FP557" belongs to the chunk group (262) "CG211".

FIG. 7 illustrates a configuration example of the chunk statistical table 280.

The chunk statistical table 280 manages an overlap prevention effect value of each hash group. The chunk statistical table 280 has a record 290 in which a hash group ID 281, a group overlap number 282, a group reduction data amount 283, a group temporary occupation data amount 284, and an overlap prevention effect value 285 are associated.

The hash group ID 281 is information to identify a hash group. The hash group ID 281 is a value of upper 4 bytes of a chunk hash value. In this case, a plurality of chunk data in which the value of the upper 4 bytes of the chunk hash value is common belongs to the same hash group. For example, a plurality of chunk data in which upper 4 bytes of a chunk hash value are "0x00000005" belongs to a chunk group of a hash group ID "0x00000005".

The group overlap number 282 is a total number of overlap numbers of individual chunk data belonging to the hash group corresponding to the hash group ID 281 and actually stored in the drive 31. An overlap number of one chunk data corresponds to the number of data blocks referring to the chunk data.

The group temporary occupation data amount 284 is a total amount of data amounts to be occupied (occupation data amounts) when the individual chunk data belonging to the hash group corresponding to the hash group ID 281 and actually stored in the drive 30 are not overlap-prevented temporarily and are stored. A temporary occupation data amount of one chunk data corresponds to the product of a size of chunk data (referred to as a "chunk size") and an overlap number of the chunk data.

The group reduction data amount 283 is a total amount of data amounts to be reduced (reduction data amounts) when the individual chunk data belonging to the hash group corresponding to the hash group 1281 and actually stored in the drive 30 are overlap-prevented. A reduction data amount of one chunk data may be calculated as "temporary occupation data amount of chunk data×(overlap number−1)". Here, because "(overlap number−1)" shows that the chunk data other than one chunk data are subjected to the overlap prevention, "(overlap number−1)" may be referred to as an "overlap prevention number".

When the chunk data is compressed and stored, a reduction data amount of one chunk data may be calculated as "(chunk size−chunk size after compression)+temporary occupation data amount×(overlap number−1)". In any case, the group reduction data amount 283 corresponds to a total amount of reduction data amounts of the individual chunk data belonging to the chunk group and actually stored in the drive 30.

The overlap prevention effect value 285 is a value to show how much the hash group corresponding to the hash group ID 281 contributes to the overlap prevention, that is, has an overlap prevention effect.

For example, when the chunk size is constant (that is, the chunk size is not changed for each chunk data), the overlap prevention effect value 285 may correspond to the group overlap number 282 of the hash group. In this case, the overlap prevention effect value increases in the hash group having the large group overlap number 282. In contrast, the overlap prevention effect value 285 decreases in the hash group having the small group overlap number 282. This is because the chunk data having the large overlap number can be estimated as chunk data having the high frequency of appearance and the same chunk data is likely to be write-requested thereafter. That is, the hash groups are sorted in order of the large overlap prevention effect value 285 (that is, order of the high frequency of appearance), so that the probability of being hit at an early stage increases when the overlap processing unit 103 executes the overlap search matched with new chunk data sequentially from the upper side.

When the chunk size is not constant (that is, the chunk size is changed for each chunk data), the overlap prevention effect value 285 may correspond to the product of the group overlap number 282 and the group reduction data amount 283 of the hash group. In this case, the overlap prevention effect value 285 increases in the hash group having the large group overlap number 282 or having the large chunk data with the large size. In contrast, the overlap prevention effect value 285 decreases in the hash group having the small group overlap number 282 or the small chunk data with the large size. This is because the reduction data amount of the chunk data having the large size when the chunk data is overlap-prevented is large, even though the frequency of appearance is low. In addition, this is because the reduction data amount of the chunk data having the small size when the chunk data is overlap-prevented is small, even though the frequency of appearance is high. That is, the hash groups are sorted in order of the large overlap prevention effect value 285, so that the probability of being hit at an early stage increases when the overlap processing unit 103 executes the overlap search matched with new chunk data sequentially from the upper side, and the possibility of becoming the large reduction data amount increases in the case of being hit.

For example, the record 290*a* shows that the group overlap number 282 is "2", the group reduction amount 283 is "1024", the group total amount 284 is "2048", and the overlap prevention effect value 285 is "$2.0 \times 10^3$", for the hash group corresponding to the hash group ID 281 "0x00000003".

Figure 8:
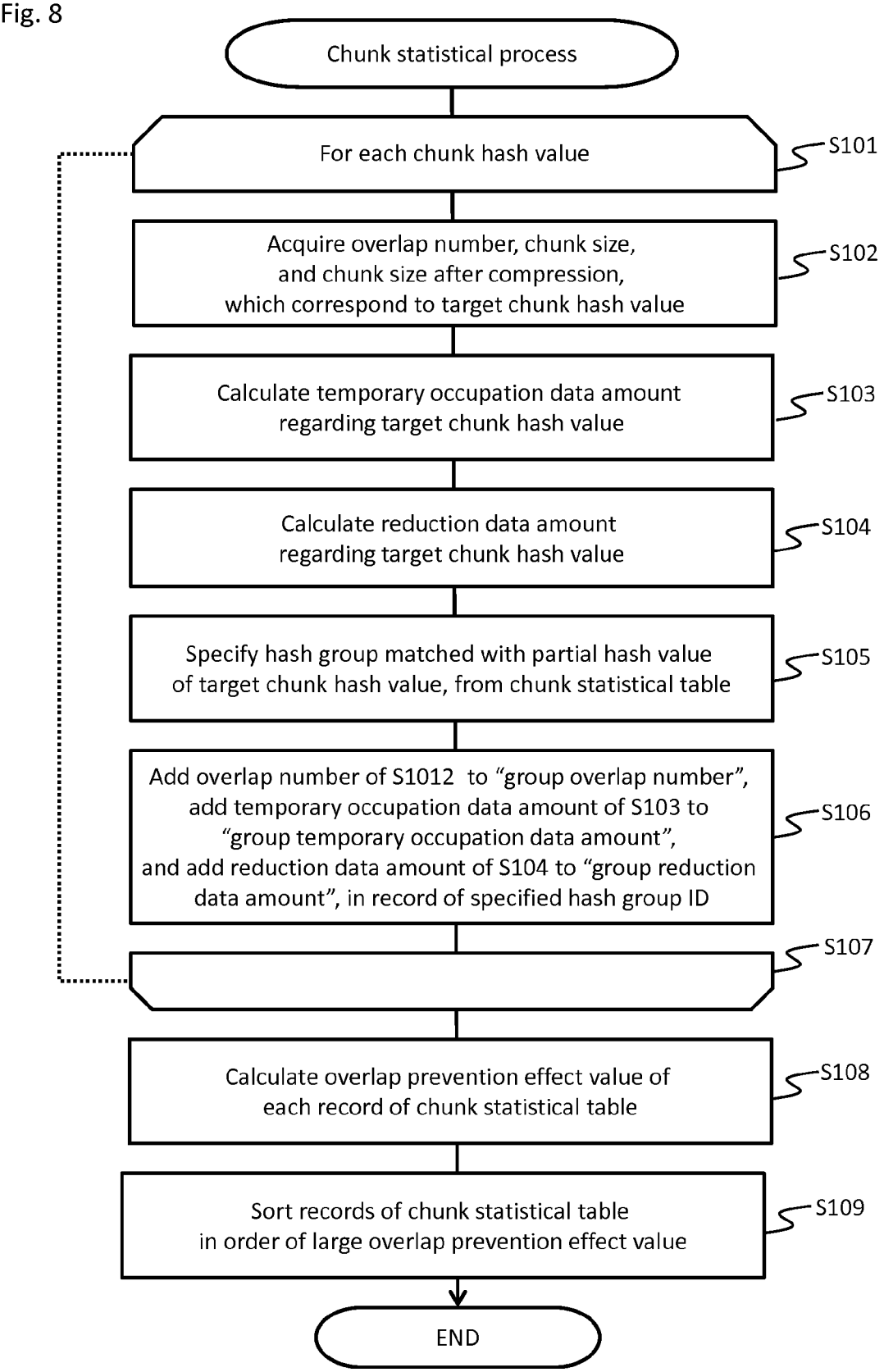
FIG. 8 is a flowchart illustrating an example of a process executed by a chunk statistical processing unit.

FIG. 8 is a flowchart illustrating an example of the process executed by the chunk statistical processing unit 104.

The chunk statistical processing unit 104 executes the processes of S101 to S107 for the individual chunk hash values stored in the chunk index table (S101). The chunk hash value of each process target is referred to as a "target chunk hash value".

The chunk statistical processing unit 104 acquires an overlap number, a chunk size, and a chunk size after compression, which correspond to the target chunk hash value (S102). For example, the chunk statistical processing unit 104 may specify a chunk group ID corresponding to the chunk hash value in the chunk index table and configure the number of data block IDs corresponding to the specified chunk group ID in the reference data block table as an overlap number corresponding to the chunk hash value.

The chunk statistical processing unit 104 calculates a temporary occupation data amount of the chunk data corresponding to the target chunk hash value (S103).

The chunk statistical processing unit 104 calculates a reduction data amount of the chunk data corresponding to the target chunk hash value (S104).

The chunk statistical processing unit 104 specifies a hash group ID (281) matched with a partial hash value of the target chunk hash value from the chunk statistical table (S105).

The chunk statistical processing unit 104 updates the record 290 regarding the specified hash group ID (281) as follows (S106).

The overlap number of S102 is added to the group overlap number (282).

The temporary occupation data amount calculated by S103 is added to the group temporary occupation data amount (284).

The reduction data amount calculated by S104 is added to the group reduction data amount (283).

After the chunk statistical processing unit 104 executes the processes of S101 to S107 for all of the chunk hash values, the chunk statistical processing unit 104 executes the following process (S107). That is, the chunk statistical processing unit 104 calculates the overlap prevention effect value (285) for each record of the chunk statistical table (S108).

The chunk statistical processing unit 104 sorts the records of the chunk statistical table in order of the large overlap prevention effect value (285) (S109) and ends this process (END).

Figure 9:
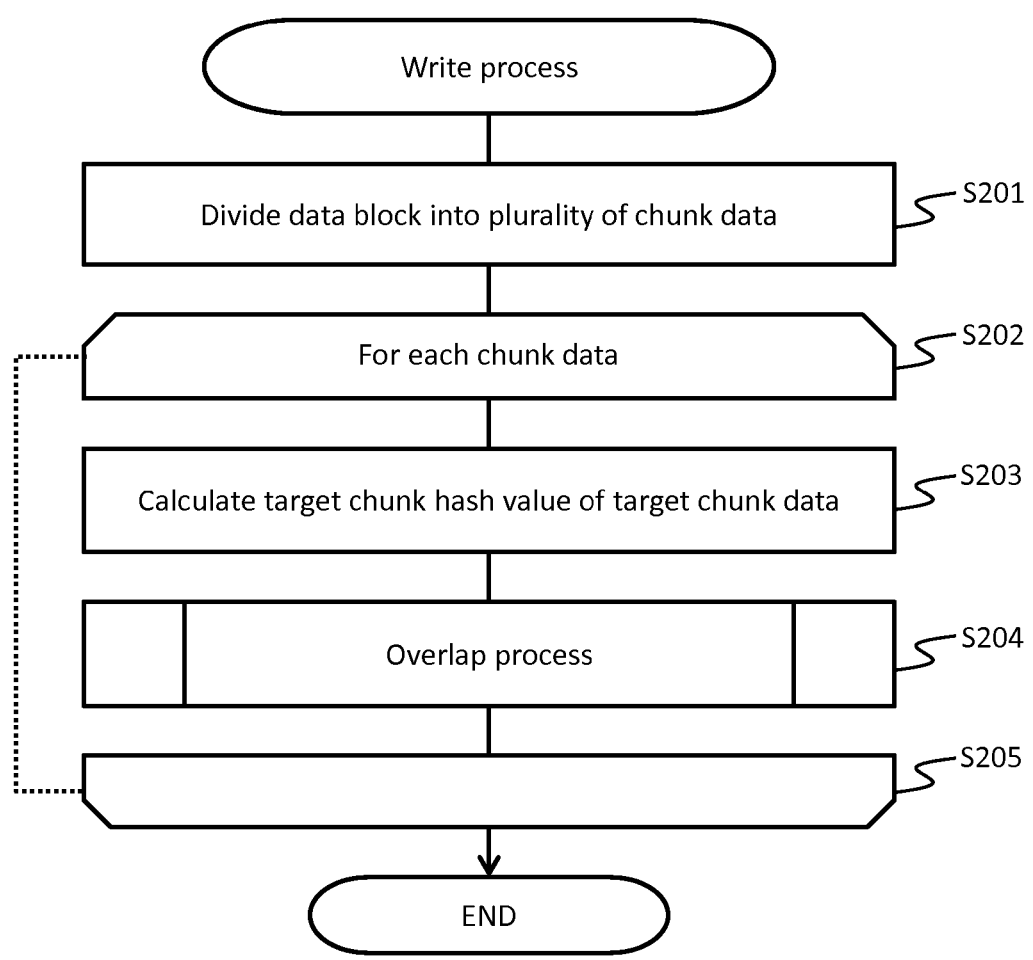
FIG. 9 is a flowchart illustrating an example of a process executed by a write processing unit.

FIG. 9 is a flowchart illustrating an example of the process executed by the write processing unit 101.

The write processing unit 101 divides a data block received together with the write request into a plurality of chunk data (S201).

The write processing unit 101 executes S202 to S205 for each divided chunk data (S202). The chunk data of each process target is referred to as a "target chunk data".

The write processing unit 101 calculates a hash value of the target chunk data (S203). The calculated hash value is referred to as a "target chunk hash value".

The write processing unit 101 executes the overlap process for the target chunk hash value (S204). This process is executed by the overlap processing unit 103. This will be described in detail below (refer to FIG. 10).

After the write processing unit 101 executes S202 to S205 for all of the divided chunk data (S205), the write processing unit 101 ends this process (END).

Figure 10:
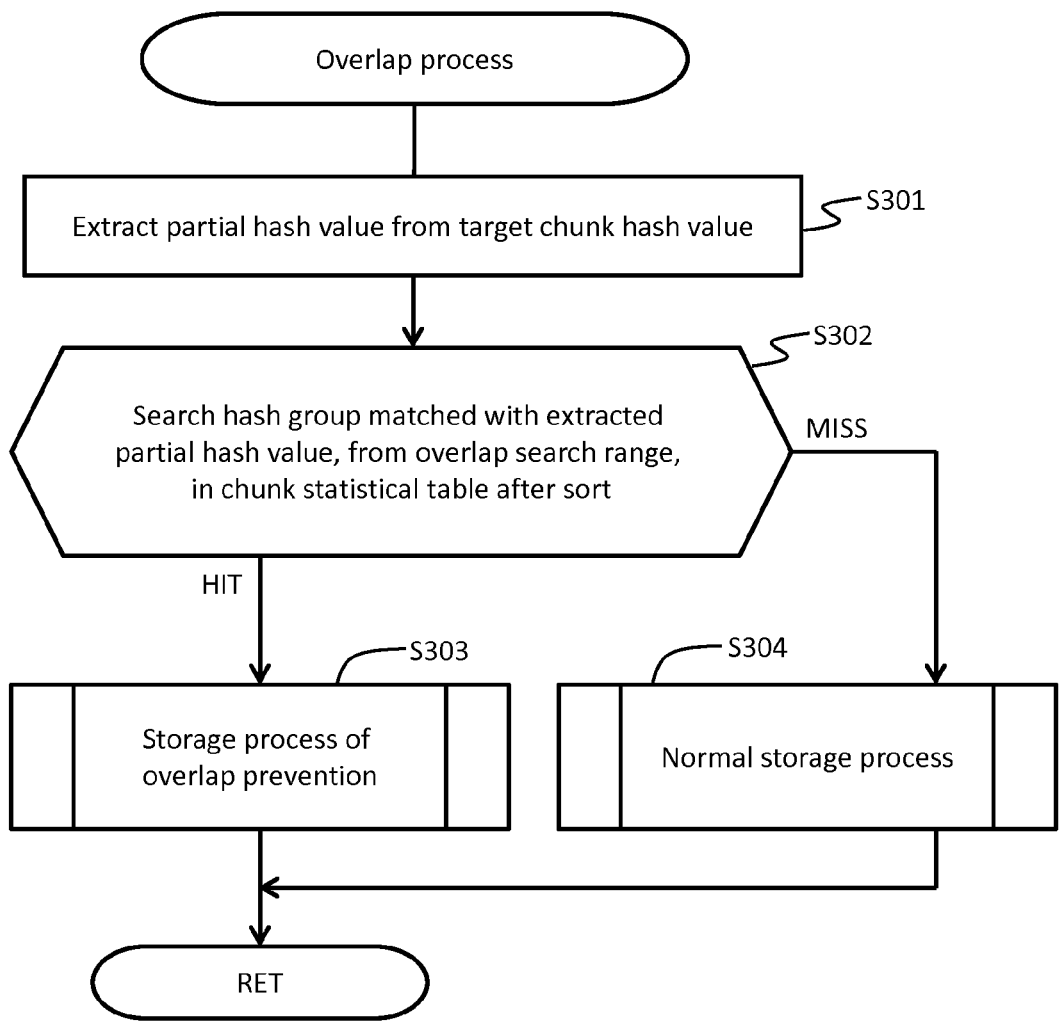
FIG. 10 is a flowchart illustrating an example of a process executed by an overlap processing unit according to the first embodiment.

FIG. 10 is a flowchart illustrating an example of the process executed by the overlap processing unit 103.

The overlap processing unit 103 extracts a partial hash value from the target chunk hash value (S301).

The overlap processing unit 103 searches (overlap search) the hash group (281) matched with the partial hash value extracted by S301 from the overlap search range, in the chunk statistical table 280 after the sort (S302).

When the overlap search is hit (HIT), the overlap processing unit 103 executes the storage process of the overlap prevention (S303) and ends this subroutine process (RET). The storage process of the overlap prevention will be described in detail below (refer to FIG. 12).

When the overlap search is not hit (MISS), the overlap processing unit 103 executes the normal storage process (S304) and ends this subroutine process (RET). This is because the overlap prevention effect requiring search time is relatively small, even though the overlap search is further executed. The normal storage process will be described in detail below (refer to FIG. 11).

Figure 11:
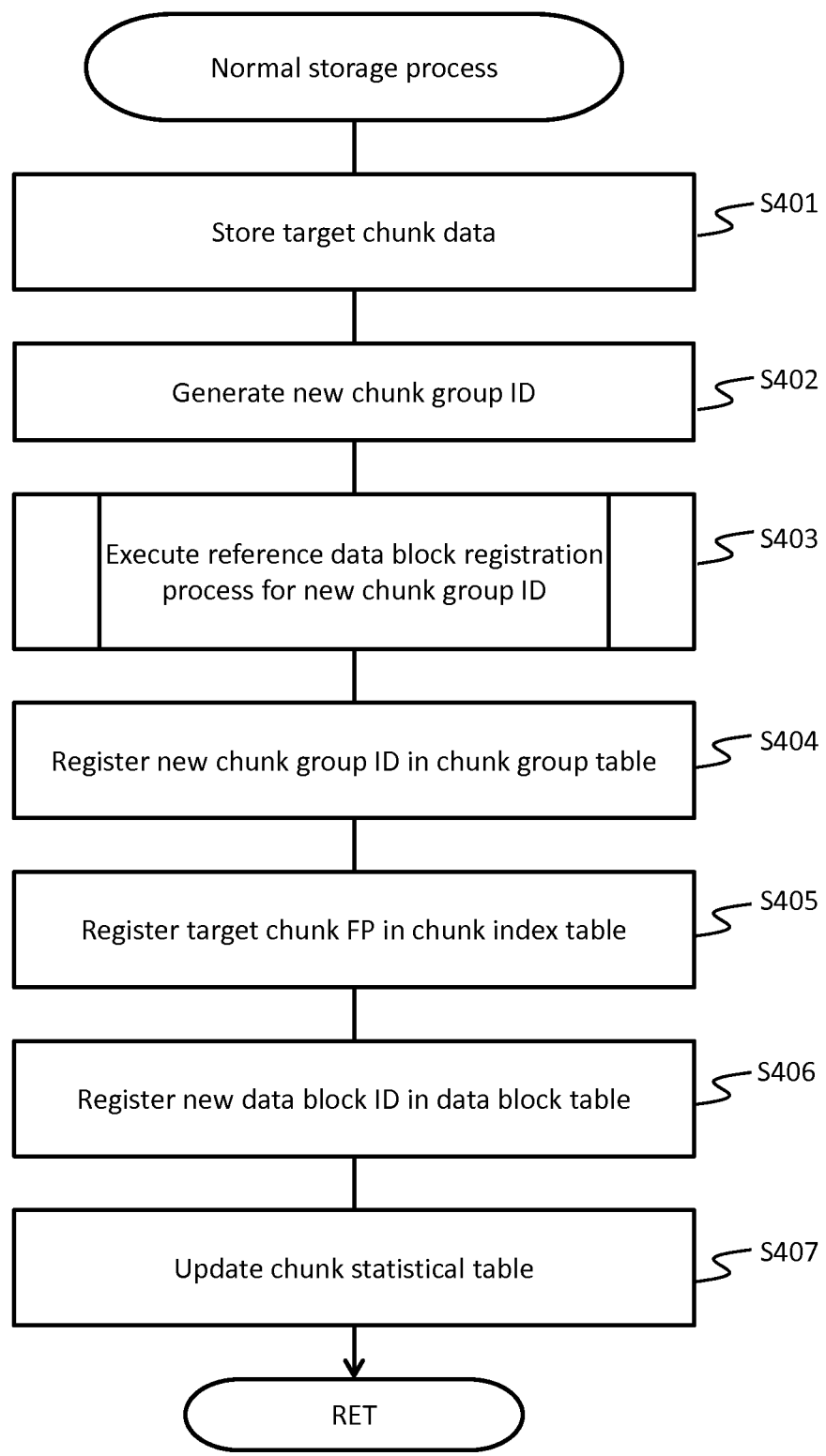
FIG. 11 is a flowchart illustrating an example of a normal storage process.

FIG. 11 is a flowchart illustrating an example of the normal storage process.

The overlap processing unit 103 stores the target chunk data in the drive 30 (S401).

The overlap processing unit 103 generates a new chunk group ID (241) in the reference data block table 240 (S402).

The overlap processing unit 103 executes the reference data block registration process for the new chunk group ID (S403) as a target. The reference data block registration process will be described in detail below (refer to FIG. 13).

The overlap processing unit 103 generates the record 230 in which the new chunk group ID (221), the target chunk hash value (222), and the target chunk data (223) are associated and registers the record 230 in the chunk group table 220 (S404).

The overlap processing unit 103 generates the record 270 in which the target chunk hash value (261) and the new chunk group ID (262) are associated and registers the record 270 in the chunk index table 260 (S405).

The overlap processing unit 103 registers the record 210 in which the data block ID (201) generated by S101, the new chunk group ID (202) according to S111 or the existing chunk group ID (202) according to S120, and the target chunk hash value (203) generated by S104 are associated, in the data block table 200 (S406).

The overlap processing unit 103 updates the chunk statistical table 280 and ends this subroutine (RET).

Figure 12:
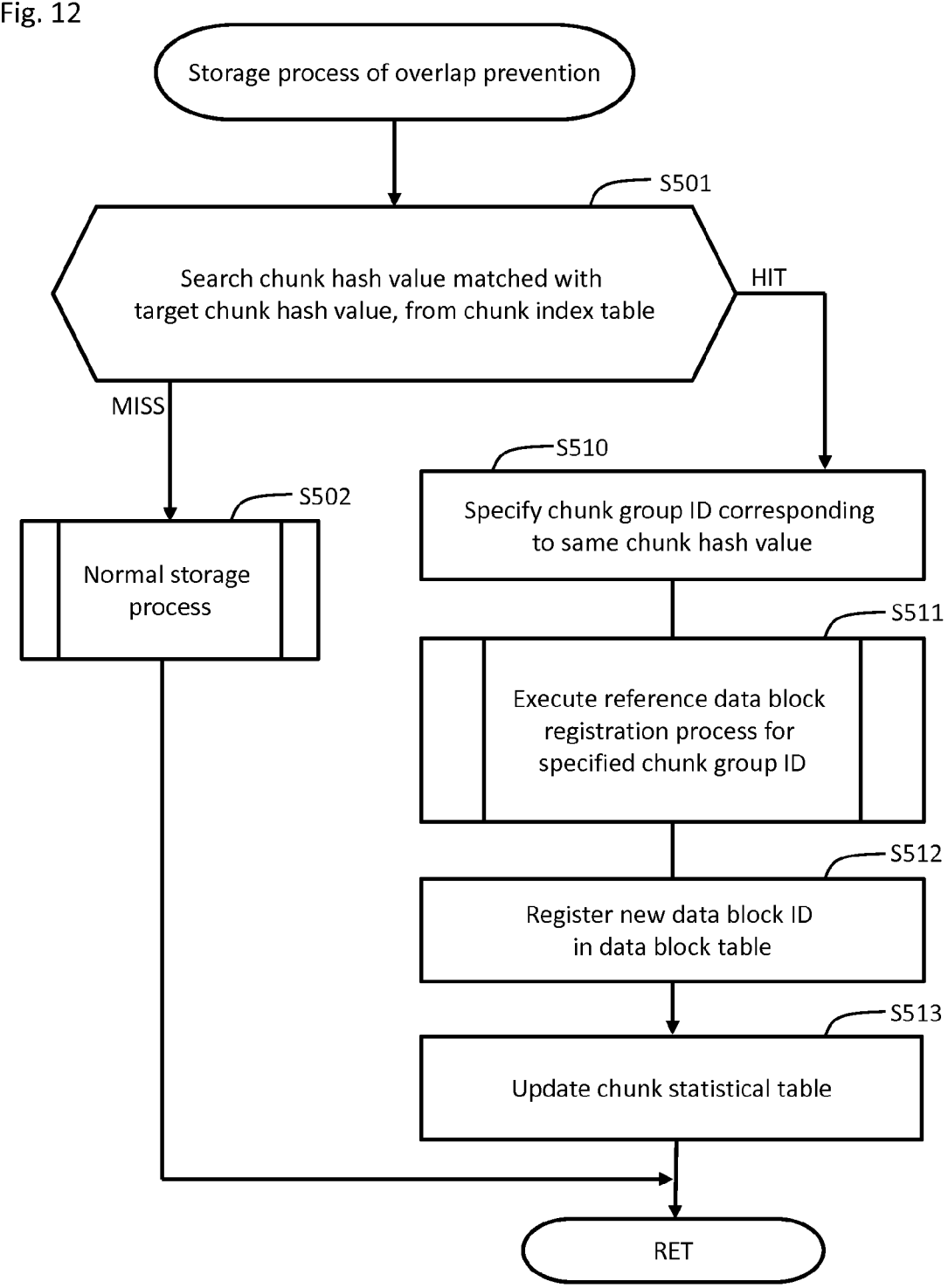
FIG. 12 is a flowchart illustrating an example of a storage process of overlap prevention.

FIG. 12 is a flowchart illustrating an example of the storage process of the overlap prevention.

The overlap processing unit 103 searches the chunk hash value matched with the target chunk hash value from the chunk index table 260 (S501).

When the search is not hit (S501: MISS), the overlap processing unit 103 executes the normal storage process illustrated in FIG. 11 (S502) and ends this subroutine (RET).

When the search is hit (S501: HIT), the overlap processing unit 103 specifies the chunk group ID (262) corresponding to the same chunk hash value (261), in the chunk index table 260 (S510).

In addition, the overlap processing unit 103 executes the reference data block registration process for the specified chunk group ID (S511) as a target. The reference data block registration process will be described in detail below (refer to FIG. 13).

The overlap processing unit 103 registers the record 210 in which the new data block ID (201), the new chunk group ID (202) or the existing chunk group ID (202), and the target chunk hash value (203) are associated, in the data block table 200.

The overlap processing unit 103 updates the chunk statistical table 280 (S513) and ends this subroutine (RET).

Figure 13:
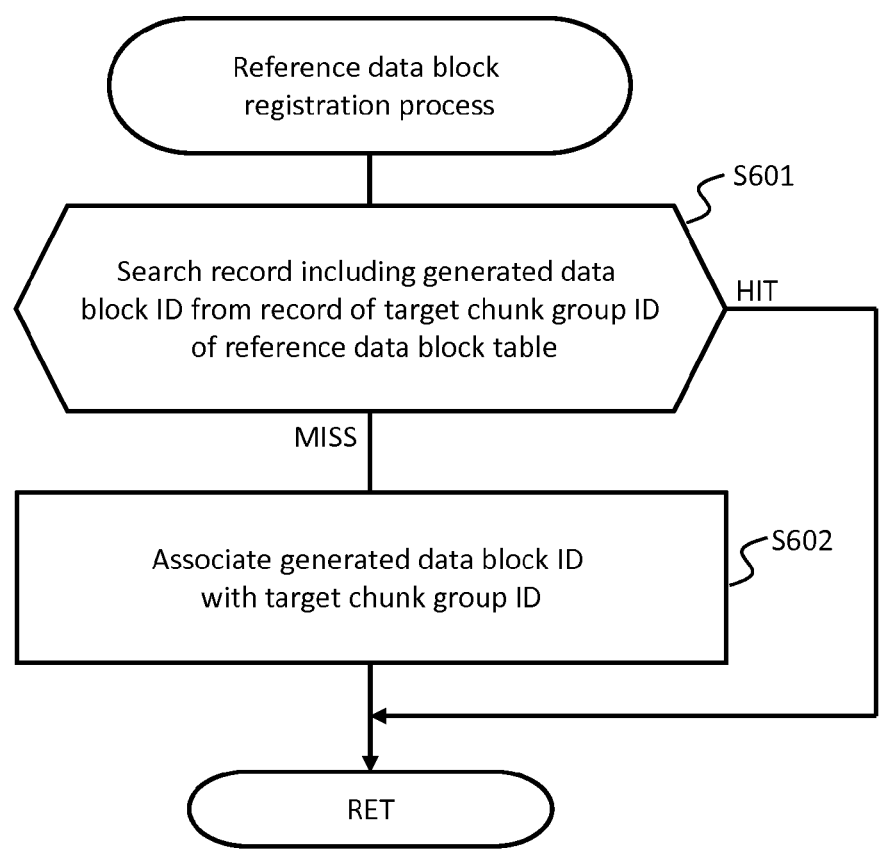
FIG. 13 is a flowchart illustrating an example of a reference data block registration process.

FIG. 13 is a flowchart illustrating an example of the reference data block registration process. This process corresponds to S403 of FIG. 11 or S511 of FIG. 12.

The overlap processing unit 103 extracts the record 250 including the chunk group ID (241) pertaining to S402 or S510 from the reference data block table 240 and searches the record 250 including the new data block ID in the extracted record 250 (S601).

When the search of S601 is not hit (S601: MISS), the overlap processing unit 103 generates the record 250 in which the target chunk group ID and the data block ID generated by S101 are associated and registers the association in the reference data block table 240 (S203). In addition, the overlap processing unit 103 ends this subroutine (RET). S601 of at least the first routine becomes MISS.

When the search of S601 is hit (S601: HIT), the overlap processing unit 103 ends this process (RET). For example, in S601 after the second routine, the search becomes HIT.

By the processes described above, in the reference data block table 240, the record 250 in which the target chunk group ID (240) and the new data block ID (242) are associated with each other is registered or updated.

According to the first embodiment, the following function and effect are achieved. That is, the overlap search is executed in only the overlap search range with the high overlap prevention effect and the chunk data is stored without executing the overlap search in the other range, so that both effective use of the drive capacity by the overlap prevention and suppression of the throughput decrease by the overlap search can be realized.

Second Embodiment

In a second embodiment, an example of the case in which an overlap search is distributed to a plurality of controllers 20 and a process load of the overlap search is alleviated will be described. The same components as those of the first embodiment are denoted with the same reference numerals and explanation thereof is omitted.

Figure 14:
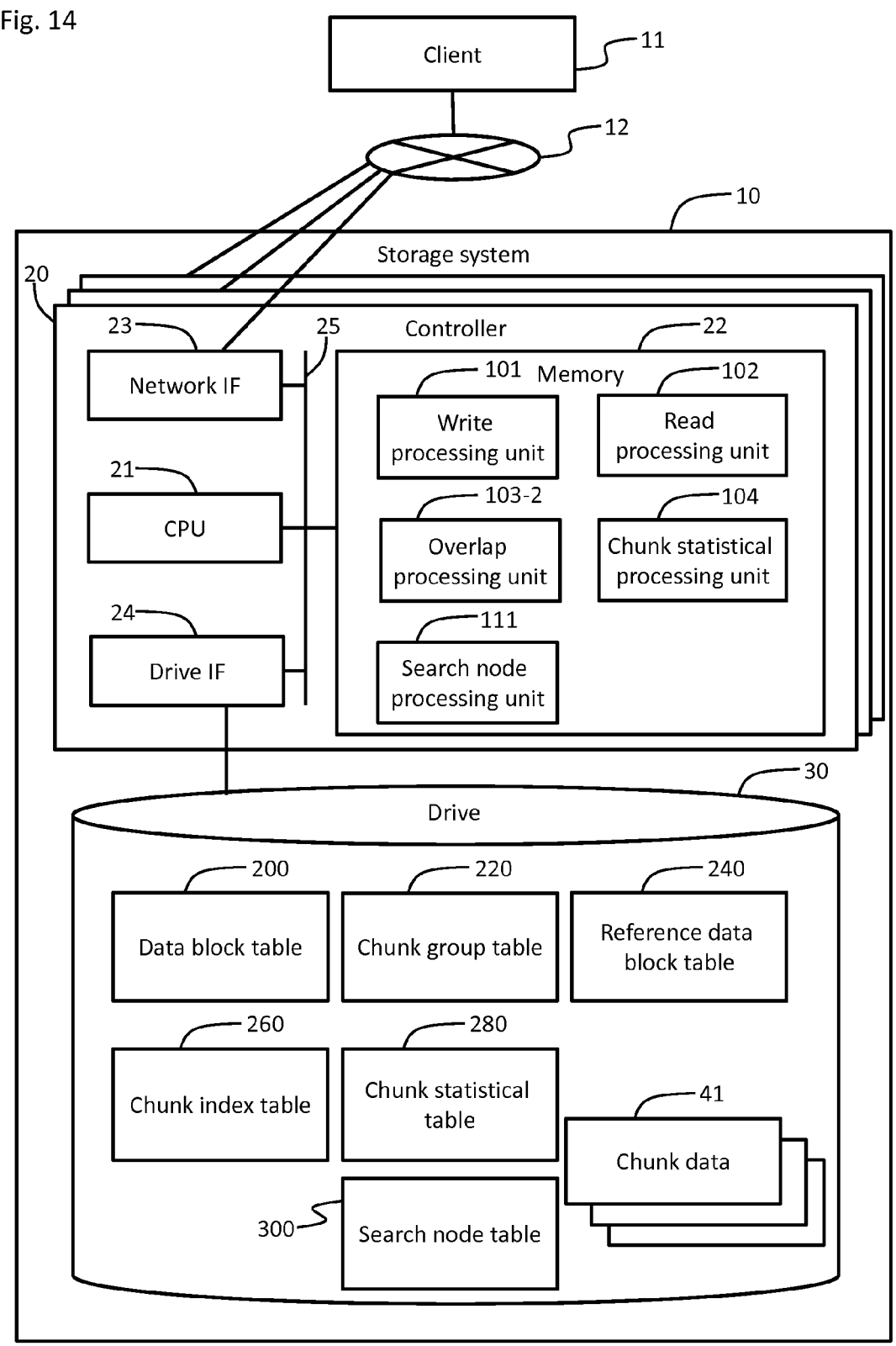
FIG. 14 illustrates a configuration example of a storage system according to a second embodiment.

FIG. 14 illustrates a configuration example of a storage system 10 according to the second embodiment.

The controller 20 has a search node processing unit 111 and an overlap processing unit 103-2 partially different from the overlap determining unit illustrated in FIG. 1, in addition to the elements illustrated in FIG. 1. In a drive 20, a search node table 300 is stored in addition to the elements illustrated in FIG. 1.

The search node processing unit 111 determines which controller (node) 20 a search of which hash group is allocated to. In addition, the search node processing unit 111 generates and updates the search node table 300, on the basis of a determination result thereof.

The search node table 300 is a table to manage which controller (node) executes a search of which hash group. The search node table 300 will be described in detail below (refer to FIG. 15).

Similar to the first embodiment, the overlap processing unit 103-2 stores chunk data in a drive 30. Here, it is necessary to search the same chunk data as chunk data of a write target from the drive 30 in an overlapped manner to execute overlap prevention. In the second embodiment, in the search node table 300, the controller 20 executing the overlap search regarding the chunk group is associated. Therefore, for chunk data of a storage target, the overlap prevention processing unit 103-2 refers to the search node table, specifies the controller 20 executing a search of a chunk group matched with a partial hash value of the chunk data of the storage target, and requests the specified controller 20 to execute the overlap search.

FIG. 15 illustrates a configuration example of the search node table 300.

The search node table 300 is a table to manage which controller (node) 20 executes an overlap search of which hash group. The search node table 300 has a record 310 in which a hash group ID 301, a node ID 302, and a skip flag 303 are associated.

The hash group ID 301 is as described in FIG. 7.

The node ID 302 is information to identify the controller 20. The node ID 302 may be an IP address or a MAC address, for example.

The skip flag 303 is a flag showing whether the overlap search is executed for a hash group corresponding to the hash group ID 301. For example, a skip flag "0" shows that the overlap search is executed and a skip flag "1" shows that the overlap search is not executed.

For example, a record 310a shows that a controller corresponding to a node ID "11" executes a search for a hash group corresponding to a hash group ID "0x00000004" and does not execute an overlap search for the hash group (skip flag "1"). This is because an overlap prevention effect value 285 corresponding to a hash group ID "0x00000004" is small as "$2.9 \times 10^4$" as compared with other overlap prevention effect values 285, in a chunk statistical table 280 of FIG. 7.

In addition, a record 310b shows that a controller corresponding to a node ID "12" executes a search for a hash group corresponding to a hash group ID "0x00000005" and executes an overlap search for the hash group (skip flag "0"). This is because an overlap prevention effect value 285 corresponding to a hash group ID "0x00000005" is large as "$3.8 \times 10^{12}$" as compared with other overlap prevention effect values 285, in a chunk statistical table 280 of FIG. 7.

Figure 16:
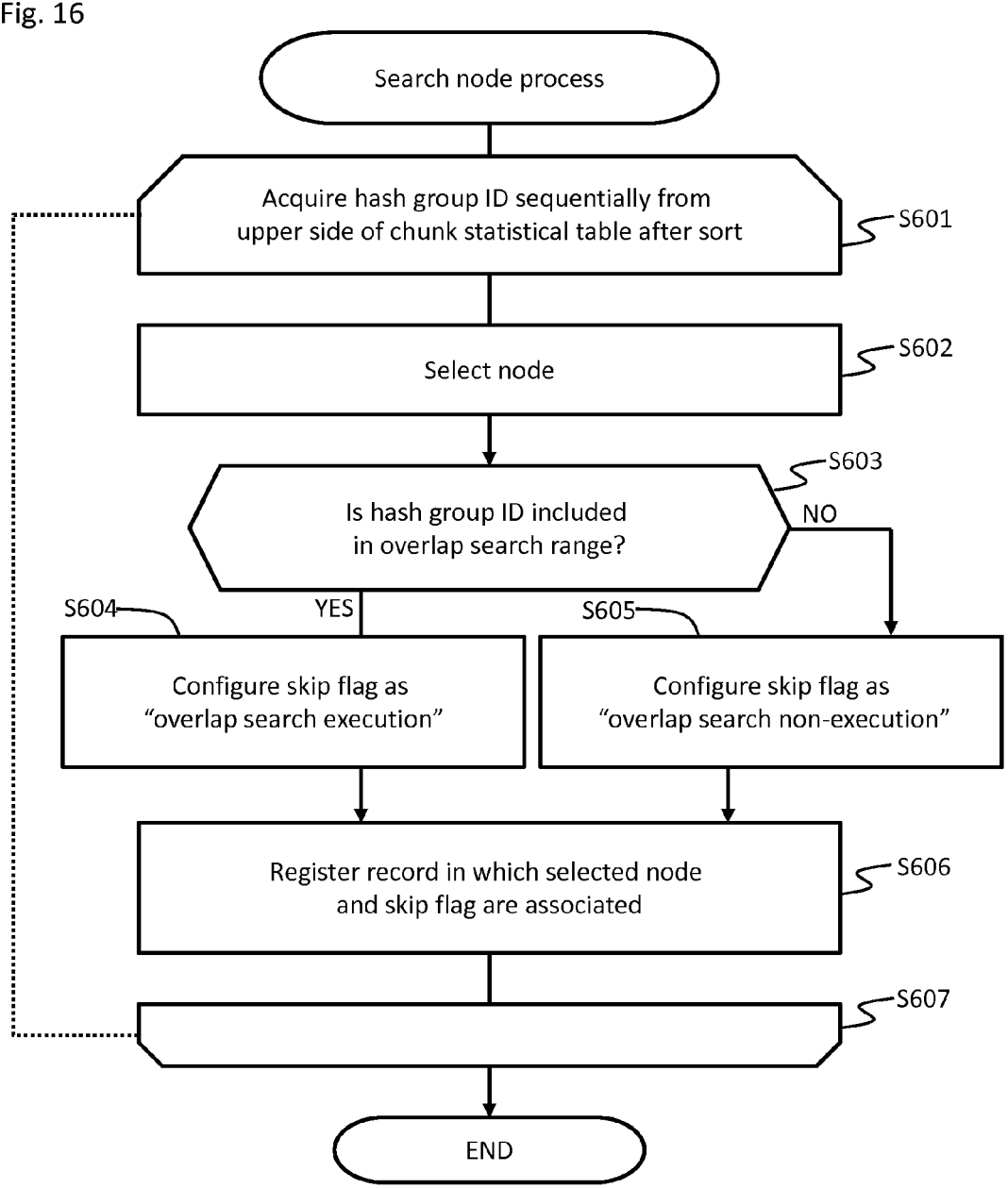
FIG. 16 is a flowchart illustrating an example of a process executed by a search node processing unit.

FIG. 16 is a flowchart illustrating an example of the process executed by the search node processing unit 111.

The search node processing unit 111 selects a hash group ID from the chunk statistical table 280 after the sort in order of a large overlap prevention effect value and executes S601 to S611 (S601).

The search node processing unit 111 selects one controller (node) 20 from a plurality of controllers 20 (S602). For example, the search node processing unit 111 may sequentially select the plurality of controllers 20 for each process. For example, the search node processing unit 111 may randomly select one controller 20 from the plurality of controllers 20.

The search node processing unit 111 determines whether the hash group ID selected by S601 is included in an overlap search range in the chunk statistical table 280 after the sort (S603).

When the hash group ID selected by S601 is included in the overlap search range (S603: YES), the search node processing unit 111 configures a skip flag (303) as overlap search execution ("0") (S604) and migrates to S606.

When the hash group ID selected by S601 is NOT included in the overlap search range (S603: NO), the search node processing unit 111 configures the skip flag (303) as overlap search non-execution ("1") (S605) and migrates to S606.

The search node processing unit 111 generates a record 310 in which the hash group ID (301) set by S601, the ID (302) of the node selected by S602, and the skip flag (303) configured by S604 or S605 are associated and registers the record in the search node table 300 (S606).

After the search node processing unit 111 executes S601 to S607 for all of hash group IDs of the chunk statistical table 280 after the sort (S607), the search node processing unit 111 ends this process (END). By the processes described above, the search node table 300 is generated.

Figure 17:
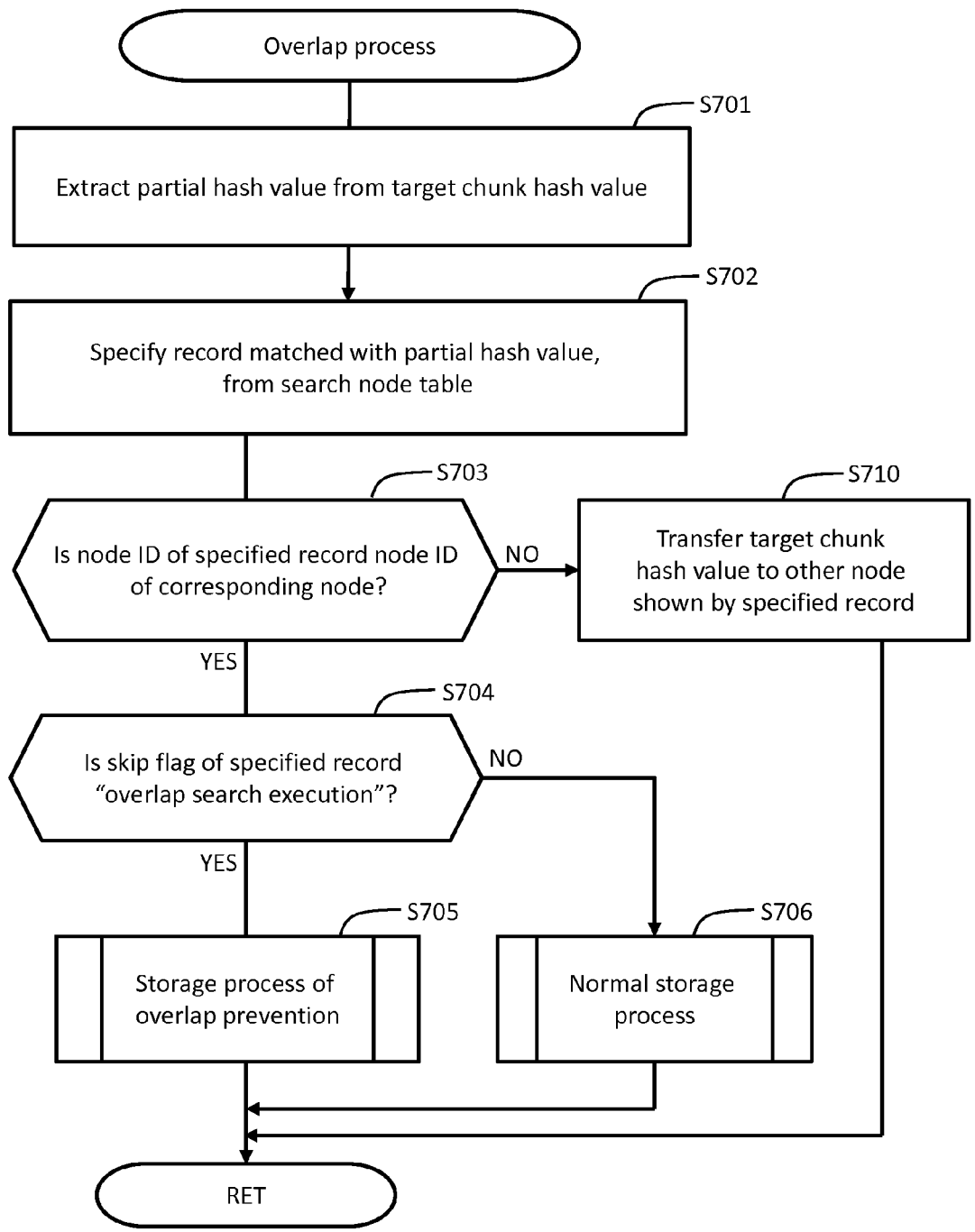
FIG. 17 is a flowchart illustrating an example of a process of an overlap processing unit according to the second embodiment.

FIG. 17 is a flowchart illustrating an example of the search of the overlap processing unit 103-2 according to the second embodiment. This process corresponds to the process of S204 of FIG. 9.

The overlap processing unit 103-2 extracts a partial hash value (for example, upper 4 bytes) of a target chunk hash value (S701).

The overlap processing unit 103-2 specifies the record 310 including the hash group ID 301 matched with the extracted partial hash value from the search node table 300 (S702).

The overlap processing unit 103-2 determines whether the node ID 302 associated in the specified record 310 is a node ID of the controller 20 thereof (S703).

When the node ID 302 in the specified record 310 is a node ID of other controller (S703: NO), the overlap processing unit 103-2 transfers information such as the target chunk hash value to the node ID of other controller (S710) and ends this subroutine process (RET). That is, other controller 20 is made to execute an overlap search process regarding the target chunk hash value. Thereby, a process load of the overlap search can be distributed to the plurality of controllers.

When the node ID 302 in the specified record 310 is the ID thereof (S703: YES), the overlap processing unit 103-2 determines whether the skip flag 303 in the specified record 310 is configured as the overlap search execution ("0") (S704).

When the skip flag 303 is configured as the overlap search execution (S704: YES), the overlap processing unit 103-2 executes the storage process (refer to FIG. 12) of the overlap prevention (S705) and ends this subroutine process (RET).

When the skip flag 303 is configured as the overlap search non-execution (S704: NO), the overlap processing unit 103-2 executes the normal storage process (refer to FIG. 11) and ends this subroutine process (RET).

The storage system according to the second embodiment achieves the following function and effect. That is, in addition to the function and the effect according to the first embodiment, the overlap search process is distributed to the plurality of controllers 20, so that the throughput decrease by the overlap search can be further suppressed.

The embodiment of the present invention described above is an example to describe the present invention and a range of the present invention is not limited by only the embodiment. The present invention can be embodied in a variety of other aspects by those skilled in the art, without departing from the scope of the present invention.

REFERENCE SIGNS LIST

10: storage system
11: client
12: communication network
20: controller
30: drive
280: chunk statistical table
300: search node table

The invention claimed is:

1. A storage system comprising:
a storage device; and
a first controller configured to control the storage device, wherein the storage device:
  stores a plurality of chunk data, wherein each stored chunk data includes constituent elements of a data block and a partial hash value of the constituent elements of the data block,
  stores chunk statistical information, wherein the statistical information includes an overlap prevention effect value of each stored chunk data and a chunk data group of each stored chunk data,
    wherein the overlap prevention effect value of each stored chunk data is a value indicating an effect of overlap prevention of the stored chunk data and is calculated based on an overlap number of the stored chunk data, and
    the overlap number of each stored chunk data is a number calculated according to an amount of chunk data that overlaps the stored chunk data;
wherein the first controller:
  receives a request to store one or more data blocks in a storage target,
  divides the one or more data blocks into one or more target chunk data,
  calculates a partial hash value of each of the one or more data blocks,
  calculates a total group overlap number that is a sum of the overlap prevention effect value for each stored chunk data within a particular chunk data group,
    wherein the particular chunk data group includes stored chunk data that has a common partial hash,
  determines an overlap match search range based on stored chunk data groups belonging to hash groups having the largest total group overlap number,
  executes an overlap match search of the stored chunk data in the overlap search range for a match of the partial hash value of each of the one or more target chunk data with the partial hash value of the each of the stored chunk data in the overlap match search range, and
  stores the one or more target chunk data in the storage device, when the partial hash value is not discovered in the overlap match search.

2. The storage system according to claim 1, wherein the partial hash value is a predetermined partial value of a hash value calculated from the chunk data.

3. The storage system according to claim 1, wherein when a group of stored chunk data with a partial hash value that matches the partial hash value of the target chunk data is found during the overlap match search, the first controller determines whether constituent elements of a data block of a stored chunk data of the group of stored chunk data matches constituent elements of a data block of target chunk data, and when the first controller determines that constituent elements of a data block of the stored chunk data of the group of stored chunk data matches the constituent elements of a data block of the target chunk data, the first controller does not store the constituent elements of a data block of the target chunk data in the storage device.

4. The storage system according to claim 1, further comprising:
a second controller,
  wherein the first controller has search node information that includes information regarding with which group of stored chunk data and with which controller the stored chunk data is associated,
  wherein the first controller further:
    specifies a particular controller associated with the group of stored chunk data based on the partial hash value associated with the group of stored chunk data, and
    when the particular controller is the second controller, the first controller requests the second controller to execute the overlap match search for the partial hash value of the storage target.

5. The storage system according to claim 1, wherein the overlap match search range is further based on stored chunk data having a predetermined ranking.

6. The storage system according to claim 1, wherein the overlap prevention effect value is further calculated based on a product of the overlap number of the stored chunk data and a data size of the stored chunk data.

* * * * *